(12) United States Patent
Ishchenko et al.

(10) Patent No.: US 9,703,309 B2
(45) Date of Patent: Jul. 11, 2017

(54) METHOD AND APPARATUS FOR DISTRIBUTED OVERRIDING AUTOMATIC RECLOSING OF FAULT INTERRUPTING DEVICES

(71) Applicant: ABB Technology AG, Zurich (CH)

(72) Inventors: Dmitry Ishchenko, Cary, NC (US); Mirrasoul J. Mousavi, Cary, NC (US)

(73) Assignee: ABB Schweiz AG, Baden (CH)

( * ) Notice: Subject to any disclaimer, the term of this patent is extended or adjusted under 35 U.S.C. 154(b) by 781 days.

(21) Appl. No.: 14/142,182

(22) Filed: Dec. 27, 2013

(65) Prior Publication Data

US 2015/0185748 A1 Jul. 2, 2015

(51) Int. Cl.
*G05F 1/66* (2006.01)
*G05B 15/02* (2006.01)
(Continued)

(52) U.S. Cl.
CPC .............. *G05F 1/66* (2013.01); *G05B 15/02* (2013.01); *H02H 3/063* (2013.01); *H02H 3/066* (2013.01); *H02H 3/07* (2013.01); *H02H 7/262* (2013.01)

(58) Field of Classification Search
CPC .......... G05F 1/66; G05B 15/02; H02H 3/063; H02H 3/066; H02H 3/07; H02H 7/262
See application file for complete search history.

(56) References Cited

U.S. PATENT DOCUMENTS 6,008,971 A * 12/1999 Duba ....................... H02H 7/30
361/64
7,626,397 B2 12/2009 Opfer et al.
(Continued)

FOREIGN PATENT DOCUMENTS

| CH | EP 2159967 A1 * | 3/2010 | ........... H04L 12/413 |
|---|---|---|---|
| WO | 2010022559 A1 | 3/2010 | |
| WO | 2012136274 A2 | 10/2012 | |

OTHER PUBLICATIONS

Glennon, et al., Improve Reliability and Power Quality on Any System, presented at Jeddah, Saudi Arabia on Dec. 9-11, 2012 (accessed from <<https://cdn.selinc.com/assets/Literature/Publications/Technical%20Papers/6531_ImproveReliability_CK_20120912_Web.pdf>> on Sep. 20, 2016).*
(Continued)

*Primary Examiner* — Kenneth M Lo
*Assistant Examiner* — Michael J Huntley
(74) *Attorney, Agent, or Firm* — Taft Stettinius & Hollister LLP

(57) ABSTRACT

Automatic reclosing of a fault interrupting device is overridden by establishing communication with a control system for a fault interrupting device operable to open responsive to a fault on an electric distribution system and automatically reclose after a predetermined time delay, and analyzing data for the electric distribution system by an apparatus separate from the fault interrupting device control system and having higher performance than the fault interrupting device control system, to determine whether to block the automatic reclosing of the fault interrupting device before the fault interrupting device automatically recloses. An autoreclosing block command is generated by the apparatus if the apparatus determines the automatic reclosing of the fault interrupting device should be blocked. The autoreclosing block command is sent from the apparatus to the fault interrupting device control system to prevent the automatic reclosing of the fault interrupting device after the predetermined time delay.

19 Claims, 9 Drawing Sheets

(51) Int. Cl.
*H02H 3/06* (2006.01)
*H02H 3/07* (2006.01)
*H02H 7/26* (2006.01)

(56) References Cited

U.S. PATENT DOCUMENTS

| | | | |
|---|---|---|---|
| 8,000,069 B2 | 8/2011 | Montenegro et al. | |
| 8,072,727 B2 | 12/2011 | O'Leary et al. | |
| 9,158,870 B2* | 10/2015 | Aparicio | G06F 17/5004 |
| 2008/0077336 A1* | 3/2008 | Fernandes | G01R 15/142 |
| | | | 702/57 |
| 2008/0215264 A1* | 9/2008 | Spanier | G01R 19/2509 |
| | | | 702/62 |
| 2008/0266733 A1 | 10/2008 | O'Leary et al. | |
| 2009/0082879 A1* | 3/2009 | Dooley | B25J 9/1658 |
| | | | 700/3 |
| 2009/0326731 A1* | 12/2009 | Bowdry | G01D 4/004 |
| | | | 700/297 |
| 2010/0036538 A1* | 2/2010 | Stergiou | H02H 7/30 |
| | | | 700/292 |
| 2011/0004446 A1* | 1/2011 | Dorn | G01D 4/002 |
| | | | 702/188 |
| 2011/0040786 A1* | 2/2011 | Zhang | G01R 19/2513 |
| | | | 707/770 |
| 2011/0320059 A1* | 12/2011 | Bishel | H04L 12/2814 |
| | | | 700/297 |
| 2012/0113555 A1* | 5/2012 | Mousavi | H02H 3/066 |
| | | | 361/78 |
| 2012/0265360 A1* | 10/2012 | Smit | G05F 1/66 |
| | | | 700/293 |
| 2013/0070378 A1* | 3/2013 | Witte | H02H 3/42 |
| | | | 361/71 |
| 2013/0229735 A1 | 9/2013 | Rostron | |
| 2014/0025321 A1* | 1/2014 | Spanier | G01R 21/133 |
| | | | 702/62 |
| 2014/0143419 A1* | 5/2014 | Vyatkin | H02J 3/46 |
| | | | 709/224 |
| 2014/0198420 A1* | 7/2014 | Kojovic | H02H 7/262 |
| | | | 361/86 |
| 2015/0303689 A1* | 10/2015 | Collantes | H02S 50/10 |
| | | | 700/295 |

OTHER PUBLICATIONS

Yaozhong, GE et al., "Prediction Methods for Preventing Single-Phase Reclosing on Permanent Fault", IEEE Transactions on Power Delivery, vol. 4, No. 1, Jan. 1989, pp. 114-121.

Terzija, V. V. et al. "Numerical Algorithm for Adaptive Autoreclosure and Protection of Medium-Voltage Overhead Lines." IEEE Transactions on Power Delivery, vol. 19, No. 2, Apr. 2004.

* cited by examiner

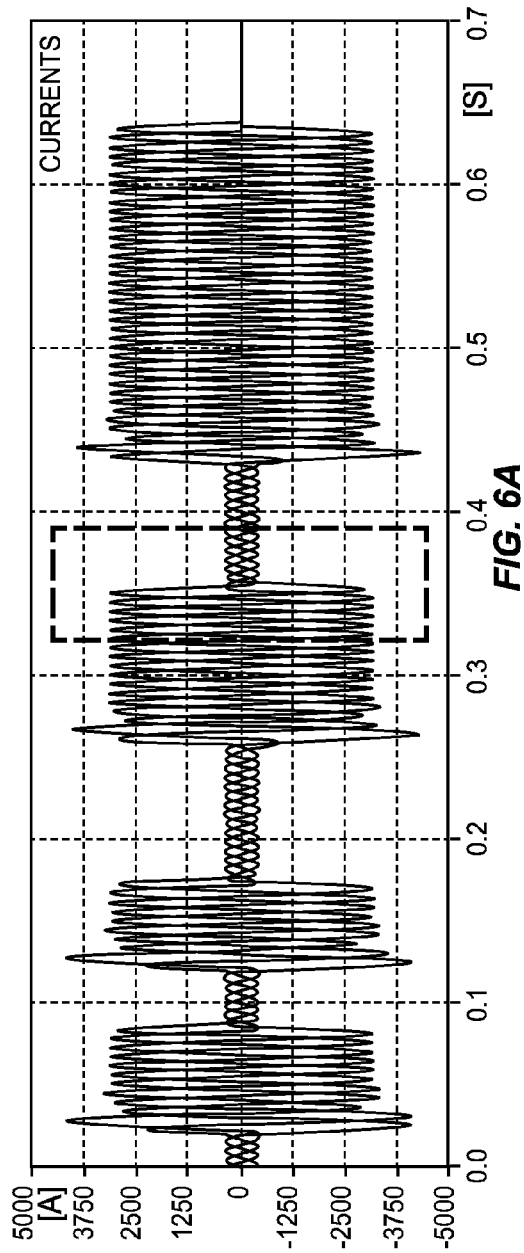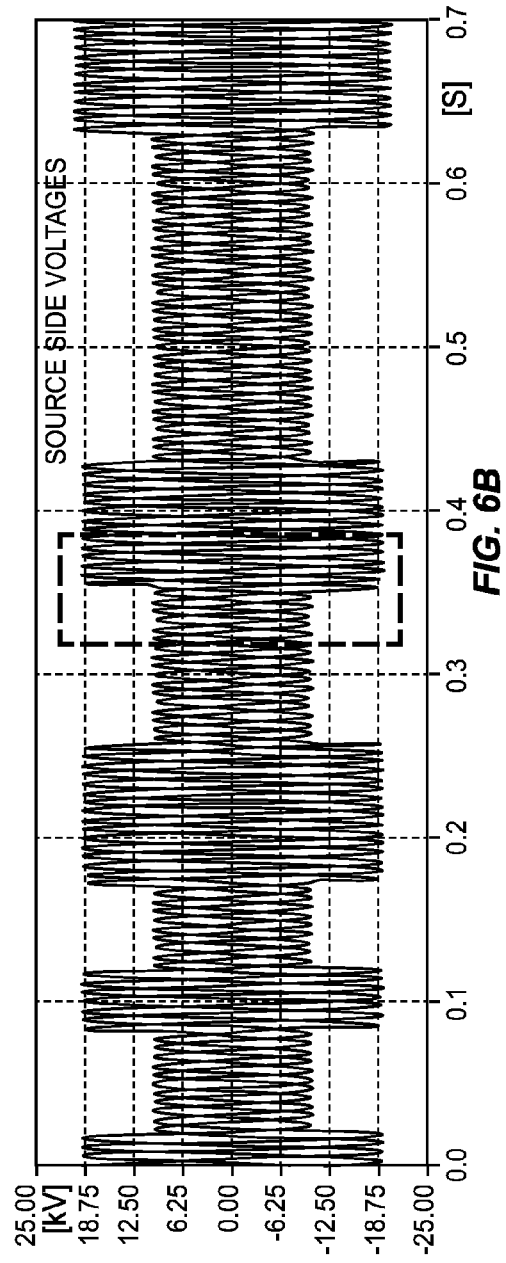

METHOD AND APPARATUS FOR DISTRIBUTED OVERRIDING AUTOMATIC RECLOSING OF FAULT INTERRUPTING DEVICES

TECHNICAL FIELD

The instant application relates to automatic reclosing of fault interrupting devices, and more particularly to distributed overriding automatic reclosing of fault interrupting devices.

BACKGROUND

In electric power distribution, fault interrupting devices such as reclosers and reclosing circuit breakers are equipped with a mechanism that automatically closes the fault interrupting device after it has been opened due to a fault. Fault interrupting devices are also used on overhead electric distribution systems to detect and interrupt momentary faults. Since many short-circuits on overhead lines clear themselves, a fault interrupting device improves service continuity by automatically restoring power to the line after a momentary fault.

The control system for a fault interrupting device allows a selected number of attempts to restore service after adjustable time delays. For example a recloser may have two or three relatively fast reclose operations with a few seconds or even fractions of a second delay, followed by a longer delay and one reclose. If the last attempt is not successful, the recloser locks out and may require human intervention to reset. If the fault is a permanent fault (e.g. downed wires, tree branches lying on the wires, etc.) the recloser exhausts its pre-programmed attempts to re-energize the line and remains tripped off until manually commanded to try again. About 80-90% of faults on overhead power lines are transient in nature and can be cleared by autoreclosing, resulting in increased availability of supply.

However, autoreclosing results in additional burden on power equipment in situations when the fault is permanent. Fault current magnitudes are typically much higher for permanent faults, especially for close-in faults. Reclosing into a permanent fault upsets the substation bus and adversely affects power quality on the healthy feeders. For example, in the current practice of reclosing, substation transformers are subjected to damaging short-circuit currents several times before the recloser locks out for a permanent fault. Additionally, the interrupter mechanism of reclosers/circuit breakers are subjected to several clearing cycles as well. These devices have limited life in terms of the number of faults and current magnitudes they can safely interrupt before maintenance is needed.

Some reclosing techniques involve utilizing condition-based control as opposed to more traditional time-based control typically used in practice in an attempt to avoid reclosing into permanent faults. For example, substation circuit breakers and field reclosers can be equipped with microprocessor-based electronic control devices referred to herein as Intelligent Electronic Devices (IEDs). IEDs accept analog signals from potential and current transformers, digitize the analog signals through an A/D (analog-to-digital) conversion stage, execute signal processing and analysis tasks via internal instructions, and issue control signals in response to power system operating conditions that require protection and/or control actions. All of these functions are conventionally internal to the IED.

Due to the tight integration of many functions in a physical IED, these devices are I/O (input/output) bound and/or processing power bound. I/O bound means that the IED cannot accept an arbitrary number of I/O channels beyond its specification. This limits the extended use of the IED when new needs arise over time, resulting in costly hardware change-outs in the field. Bound by processing power means that the IED processor is limited to performing tasks originally considered in the design stage, again limiting the extended use of the IED in the field. For example conventional IEDs used for protection purposes only require a low sampling rate of about 32 samples/cycle (1.92 kHz @ 60 Hz fundamental frequency) or less, that may limit the type of events such as faults and high frequency transients that can be detected and analyzed.

SUMMARY

According to the embodiments described herein, distributed control of fault interrupting devices such as reclosers and reclosing circuit breakers is provided so that computationally-intensive tasks e.g. that utilize floating-point computations are offloaded to an external system separate from the recloser control system. By provisioning a fast and reliable communication interface to the recloser control system, a distributed architecture introduces manageable segmentation of the traditional control system signal path. This in turn liberates the user from the intrinsic I/O and processing power bounds that would otherwise limit distributed protection and control functions and extensions thereof.

According to an embodiment of an apparatus, the apparatus comprises a communication interface and a processing circuit. The communication interface is operable to enable communication with a control system for a fault interrupting device operable to open responsive to a fault on an electric distribution system and automatically reclose after a predetermined time delay. The processing circuit has higher performance than the fault interrupting device control system and is operable to analyze data for the electric distribution system to determine whether to block the automatic reclosing of the fault interrupting device before the fault interrupting device automatically recloses. The processing circuit is also operable to generate an autoreclosing block command if the processing circuit determines the automatic reclosing of the fault interrupting device should be blocked. The communication interface is further operable to communicate the autoreclosing block command to the fault interrupting device control system to prevent the automatic reclosing of the fault interrupting device after the predetermined time delay.

According to an embodiment of a method of overriding automatic reclosing of a fault interrupting device, the method comprises: establishing communication with a control system for a fault interrupting device operable to open responsive to a fault on an electric distribution system and automatically reclose after a predetermined time delay; analyzing data for the electric distribution system by an apparatus separate from the fault interrupting device control system and having higher performance than possible in the fault interrupting device control system, to determine whether to block the automatic reclosing of the fault interrupting device before the fault interrupting device automatically recloses; generating an autoreclosing block command by the apparatus if the apparatus determines that the automatic reclosing of the fault interrupting device should be blocked; and sending the autoreclosing block command from the apparatus to the fault interrupting device control system to prevent the automatic reclosing of the fault interrupting device after the predetermined time delay.

Those skilled in the art will recognize additional features and advantages upon reading the following detailed description, and upon viewing the accompanying drawings.

BRIEF DESCRIPTION OF THE DRAWINGS

The components in the figures are not necessarily to scale, instead emphasis being placed upon illustrating the principles of the invention. Moreover, in the figures, like reference numerals designate corresponding parts. In the drawings:

FIG. 6, which includes FIGS. 6A and 6B, illustrates current and voltage waveforms sampled by an apparatus communicatively coupled to a fault interrupting device controller system for providing distributed control of the fault interrupting device.

DETAILED DESCRIPTION

Figure 1:
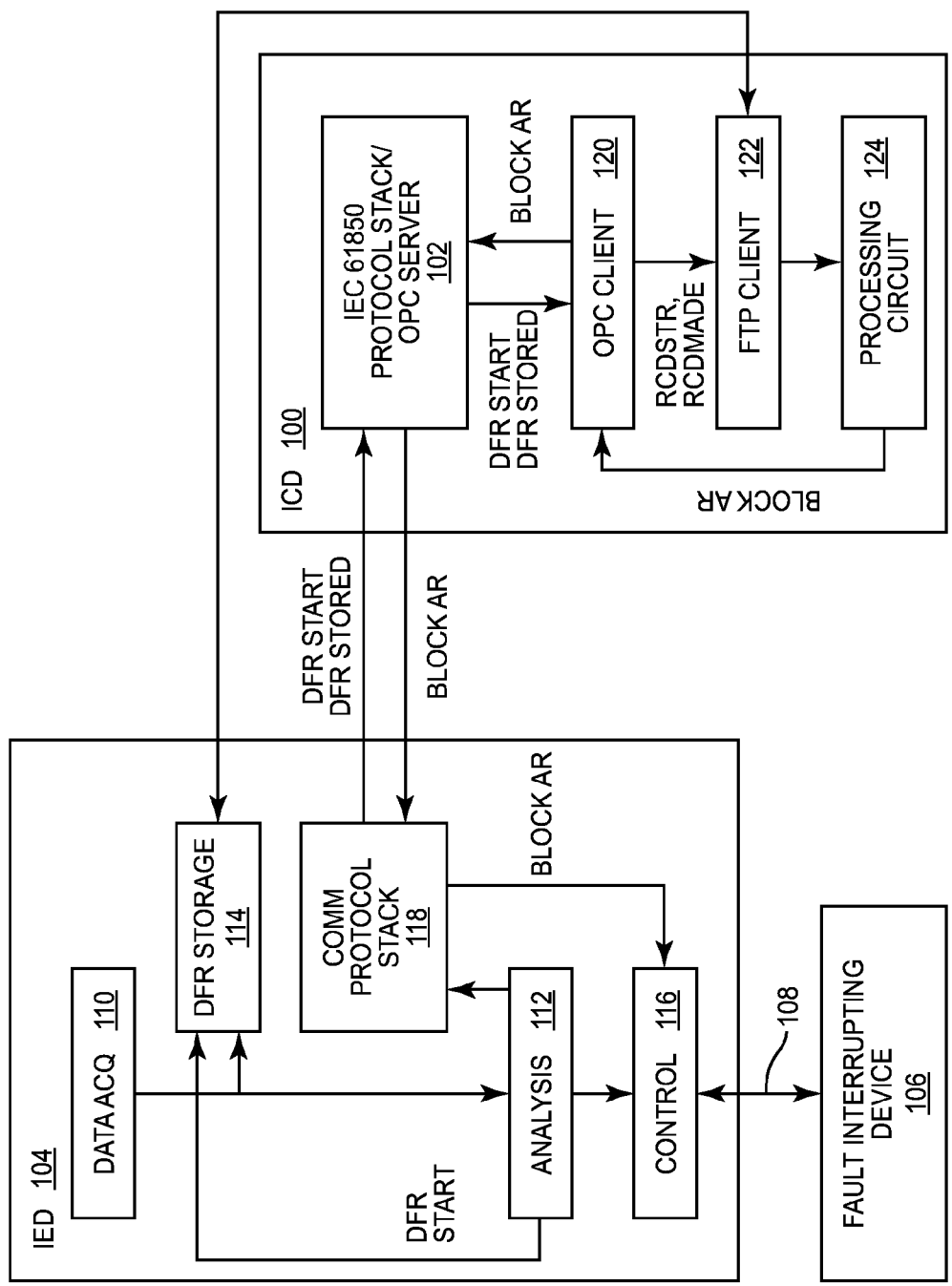
FIG. 1 illustrates a block diagram of an embodiment of an apparatus communicatively coupled to a fault interrupting device control system for providing distributed control of a fault interrupting device.

Described next are methods and apparatuses for overriding automatic reclosing of fault interrupting devices such as reclosers and reclosing circuit breakers in an electric distribution system via distributed control. Instead of implementing the reclosing override functions exclusively in an IED (also referred to herein as fault interrupting device control system), an additional apparatus (also referred to herein as softrecloser intelligent control device or ICD for short) is provided for implementing reclosing override functions in a distributed manner and communicating with the IED in order to prevent automatic reclosing of fault interrupting devices under certain conditions e.g. in the event of a permanent fault type (e.g. downed wires, tree branches lying on the wires, etc.).

In such a distributed architecture design, reclosing analysis and blocking tasks are delegated to an external system that is interchangeable and cost-effective compared to the conventional vertically-integrated IED designs. By provisioning a fast and reliable communication interface to the IED, a distributed architecture introduces manageable segmentation in the traditional IED signal path, liberating the user from the I/O and processing power bounds that would otherwise limit distributed protection and control functions and extensions thereof. For example, if an IED for reclosing control is limited in processing power, a second microprocessor external to the original IED may be deployed for additional and/or computationally-intensive tasks to avoid reclosing into permanent faults. Also, upgrades and extensions can be much more easily and cost-effectively implemented in the case of a distributed architecture. The same extensions and upgrades would be much more difficult and expensive to implement with conventional IEDs and automation systems in a multi-vendor environment, where access to the kernel of IEDs are limited and implementations are highly proprietary.

The distributed reclosing control architecture described herein can be embodied in different forms as will be appreciated by those skilled in the art in view of the exemplary embodiments described herein. The illustrative examples described herein can be implemented in a distributed way that aims at blocking further autoreclosing attempts in case of permanent faults that occur in overhead electric distribution systems, minimizing the effects of through-fault currents on the feeder components upstream of the fault. This is only one example for illustration and intended to demonstrate the benefits and usefulness of the underlying distributed reclosing control architecture described herein.

In general, the ICD embodiments described herein include a communication interface for enabling communication with a fault interrupting device control system (i.e. IED) and a processing circuit for analyzing data for an electric distribution system to determine whether to block the automatic reclosing of the fault interrupting device e.g. in the case of a permanent fault type. The processing circuit has higher performance than the IED so that the processing circuit can determine whether to block the automatic reclosing of the fault interrupting device before the fault interrupting device automatically recloses. The term "higher performance" as used herein includes at least one of higher precision (including higher precision sensors), higher accuracy, higher sampling rate, and higher computational speed.

The processing circuit generates an autoreclosing block command if the processing circuit determines that the automatic reclosing of the fault interrupting device should be blocked. The communication interface communicates the autoreclosing block command to the IED to prevent reclosing of the fault interrupting device after the predetermined reclosing time delay. The status/control/file/data exchange between the ICD and the IED is organized via the communication interface, for instance Ethernet, wireless cellular or wireless radio communication. The processing circuit of the ICD can include digital and/or analog circuitry such as one or more controllers, processors, ASICs (application-specific integrated circuits), etc. for executing program code which implements the reclosing override functions described herein.

Such a distributed architecture provides an external microprocessor-based apparatus (i.e. ICD) which is connected to an IED through a communication interface and is operable to, for example, execute waveform analysis, determine whether to block the automatic reclosing of a fault interrupting device and issue a corresponding autoreclosing blocking command when appropriate.

FIG. 1 illustrates an embodiment of an ICD 100. According to this embodiment, the ICD 100 is integrated in a substation computer such as a grid automation controller. A grid automation controller is an all-in-one communication gateway, automation platform and user interface solution for utility and industrial distribution substations. The gateway functionality provides connectivity between substation IEDs and network-level control and management systems.

The communication interface 102 of the ICD 100 enables communication with a fault interrupting device control system (i.e. IED) 104. The IED 104 controls a fault interrupting device 106 such as a recloser or reclosing circuit breaker via an interface 108. This includes opening the fault interrupting device 106 responsive to a fault on the electric distribution system and automatically reclosing the fault interrupting device 106 after a predetermined time delay. Any standard IED 104 can be used such as a dedicated feeder IED aligned for the protection, control, measurement and supervision of utility and industrial power distribution systems.

The IED 104 also has data acquisition circuitry 110 for accepting analog signals from potential and current transformers and digitizing the analog signals through an A/D conversion stage. The IED 104 also includes analysis circuitry 112 for executing signal processing and analysis tasks via internal instructions to determine whether a fault has occurred. In one embodiment, the analysis circuitry 112 of the IED 104 generates digital fault records which are stored in memory 114 of the IED 104. Each digital fault record (DFR) represents a time-domain snapshot of voltage and current waveforms observed at the fault interrupting device 106 before and after a fault. The IED 104 further includes control circuitry 116 for issuing control signals to the fault interrupting device 106, in response to power system operating conditions that require protection and/or control actions.

The IED 104 also has a communication protocol stack 118 for communicating the digital fault records to the ICD 100. According to the embodiment of FIG. 1, the communication interface 102 of the ICD 100 implements a protocol stack compliant with IEC 61850 for enabling MMS-based communication with the IED 104. IEC 61850 is a standard for the design of electrical substation automation and is a part of the International Electrotechnical Commission's (IEC) Technical Committee 57 (TC57) reference architecture for electric power systems. MMS (Manufacturing Message Specification) is an international standard (ISO 9506) dealing with messaging system for transferring real time process data and supervisory control information between networked devices and/or computer applications. MMS is developed and maintained by the ISO Technical Committee 184 (TC184) and defines a set of standard objects which exist in every device, on which operations like read, write, event signaling etc. can be executed. MMS also defines a set of standard messages exchanged between a client and a server stations for the purpose of monitoring and/or controlling these objects. MMS further defines a set of encoding rules for mapping these messages to bits and bytes when transmitted.

The IED 104 exchanges digital fault records with the ICD 102 via MMS-based messaging according to the embodiment of FIG. 1. The digital fault records are delivered to a built-in OPC server 120 included in the ICD 100. OLE for Process Control (OPC), which stands for Object Linking and Embedding (OLE) for Process Control, is the original name for a standards specification developed in 1996 by an industrial automation industry task force. The standard specifies the communication of real-time plant data between control devices from different manufacturers.

The intelligent switching application in this case includes the OPC client module that connects to the OPC server 120 to receive updates on the IED status. For example, when the IED 104 detects a fault, the IED 104 begins to record a new digital fault record. The digital fault record includes voltage and current data before and after the fault. The digital fault record can include any available data that may at least partially be used to identify the occurrence of a fault and/or to characterize the fault. For example, the digital fault record can include current, voltage, phasor and/or impedance measurements for at least one phase of the power distribution line protected by the fault interrupting device. In some examples, the gathered data may include information regarding weather or other environmental conditions proximate the fault interrupting device and/or the power line.

The IED 104 communicates the start of a new digital fault record to the ICD 100 via an MMS-based message. The communication interface 102 of the ICD 100 can include an FTP client 122 for retrieving the digital fault record from an FTP server of the IED 104. The IED FTP server can be part of the communication protocol stack 118 of the IED 104. In response to a message (DFR Start) indicating the IED 104 has begun recording a new digital fault record, the OPC client 120 notifies the FTP client 122 of the new digital fault record via a message or command (RcdStr). In response, the FTP client 122 opens an FTP (File Transfer Protocol) connection with the FTP server of the IED 104. This way, an FTP connection already exists between the ICD 100 and the IED 104 by the time recording of the digital fault record is complete.

The IED 104 communicates to the ICD 100 when recording of the digital fault record is complete via an MMS-based message (DFR Stored). The OPC client 120 in turn notifies the FTP client 122 that the new digital fault record is available via a message or command (RcdMade). In response, the FTP client 122 reads the digital fault record from the memory 114 of the IED 104 via the preexisting FTP connection and then closes the FTP connection after the digital fault record is retrieved. An alternative mechanism can be websockets. Websockets can broadcast the digital fault record to the ICD 100 through a subscription mechanism. In either case, the processing circuit 124 of the ICD 100 e.g. a COM600 grid automation controller or other type of substation computer controller executes any standard fault identification algorithm on the digital fault record to determine whether to block the automatic reclosing of the fault interrupting device 106. In one embodiment, the processing circuit 124 of the ICD 100 analyzes the digital fault record to determine whether the fault is a temporary fault type or a permanent fault type.

For example, the processing circuit 124 of the ICD 100 can analyze the harmonic content, peaks, magnitude, frequency, and/or other features of the data contained in the digital fault record to determine whether the fault is temporary or permanent. In the case of a temporary fault, the momentary nature of the fault can be determined by identifying a cycle-to-cycle variation in the current magnitude, in its frequency spectrum, and/or in a measured impedance. In the case of a permanent fault, the fault signal may exhibit a lack of dynamic variation, such as a relatively constant or stationary magnitude and/or frequency spectrum, over the cycles of data recorded prior to the fault interrupting device opening to interrupt the fault. As such, for example, the processing circuit 124 of the ICD 100 can determine the permanent nature of the fault by identifying a lack of cycle-to-cycle variation in the current magnitude and/or frequency spectrum or in a measured impedance. The processing circuit 124 of the ICD 100 can execute still other types of standard fault identification algorithms on the digital fault record to determine whether the fault is a temporary fault type or a permanent fault type.

In each case, the processing circuit 124 of the ICD 100 has higher performance than the IED 104 so that the processing circuit 124 can determine whether automatic reclosing of the fault interrupting device 106 should be blocked before the fault interrupting device 106 automatically recloses. The processing circuit 124 of the ICD 100 generates an autoreclosing block command (Block AR) if the processing circuit 124 determines that the automatic reclosing of the fault interrupting device 106 should be blocked. The autoreclosing block command is communicated to the IED 104 through the OPC client/server/IEC 61850 reporting mechanism previously described herein. In response, the IED 104 prevents reclosing of the fault interrupting device 106 after the predetermined time delay.

One reason for blocking the autoreclosing of the fault interrupting device 106 is if the fault is permanent, but there can be other reasons not related to fault type. For example, utilities sometimes block autoreclosing during storms. This can be achieved in a distributed way according to the embodiments described herein. As such the autoreclosing block command can be issued by the ICD 100 if any feeder conditions for the electric distribution system warrant such action, and a permanent fault type is one such condition.

Figure 2:
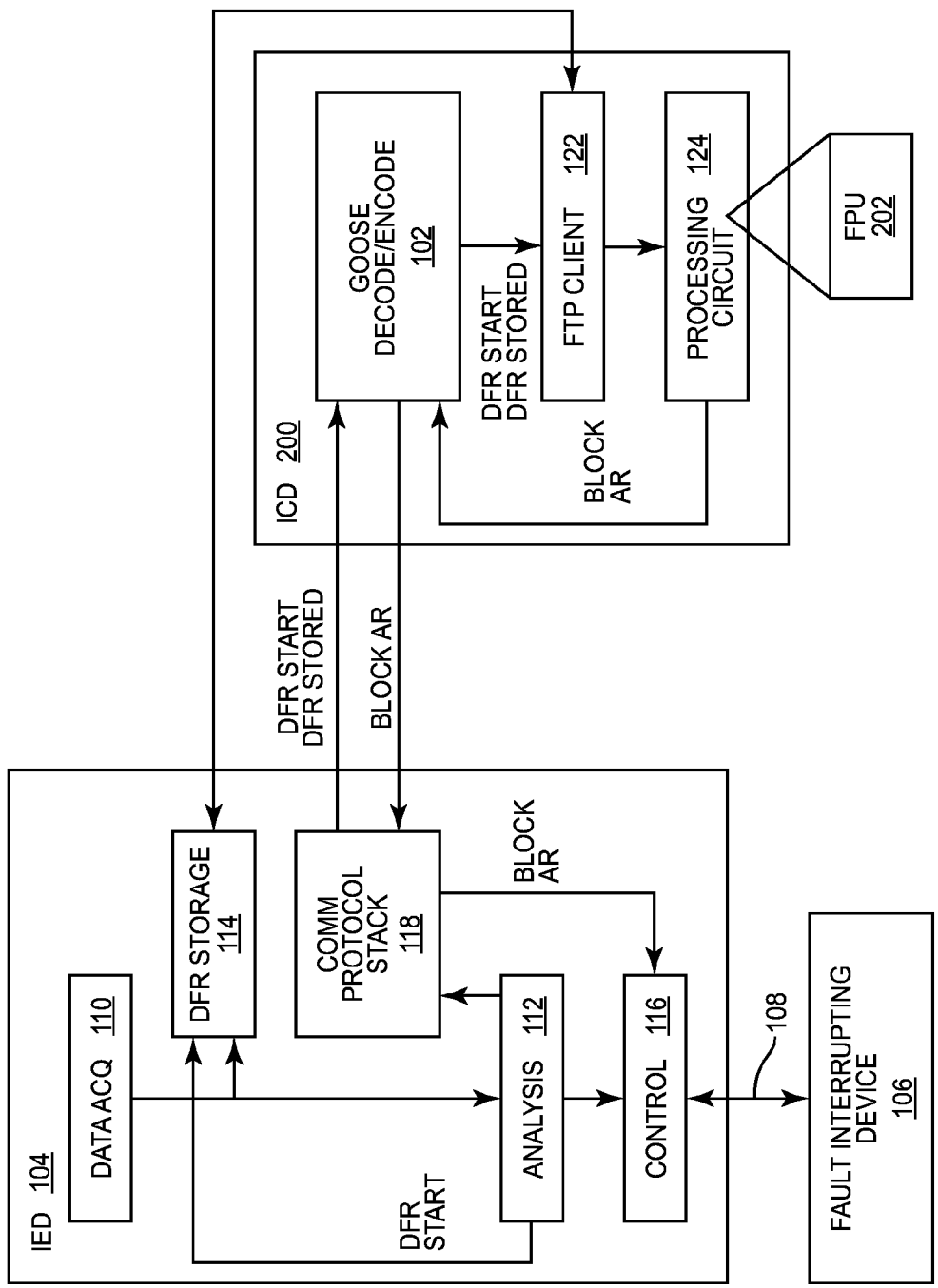
FIG. 2 illustrates a block diagram of another embodiment of an apparatus communicatively coupled to a fault interrupting device control system for providing distributed control of a fault interrupting device.

FIG. 2 illustrates another embodiment of an ICD 200. The embodiment shown in FIG. 2 is similar to the one shown in FIG. 1, however, the protocol stack implemented by the communication interface 102 of the ICD 200 supports GOOSE (Generic Object Oriented Substation Events) messaging instead of MMS messaging. GOOSE messages are defined by IEC 61850-8-1 and are more lightweight than MMS messages, therefore bypassing the heavy overhead associated with the MMS stack.

GOOSE is a control model mechanism in which any format of data (status, value) is grouped into a data set and transmitted within a time period of four milliseconds. GOOSE data is directly embedded into Ethernet data packets and works on publisher-subscriber mechanism on multicast or broadcast MAC addresses. GOOSE uses VLAN (virtual local area network) and priority tagging as per IEEE 802.1Q to have a separate virtual network within the same physical network and sets appropriate message priority level. The same GOOSE message can be retransmitted with varying and increasing re-transmission intervals. A new event occurring within any GOOSE dataset element results in the existing GOOSE retransmission message being stopped. A state number within the GOOSE protocol identifies whether a GOOSE message is a new message or a retransmitted message. The communication protocol stack 118 implemented by the IED 104 is compatible with the GOOSE messaging protocol according to this embodiment.

Also according to the embodiment of FIG. 2, the processing circuit 124 of the ICD 200 is a microcontroller such as an ARM microcontroller. The microcontroller 124 can include a floating point unit (FPU) 202 for analyzing digital fault records received from the IED 104. By having floating point support, the processing circuit 124 of the ICD 200 has significantly higher performance than the IED.

Figure 3:
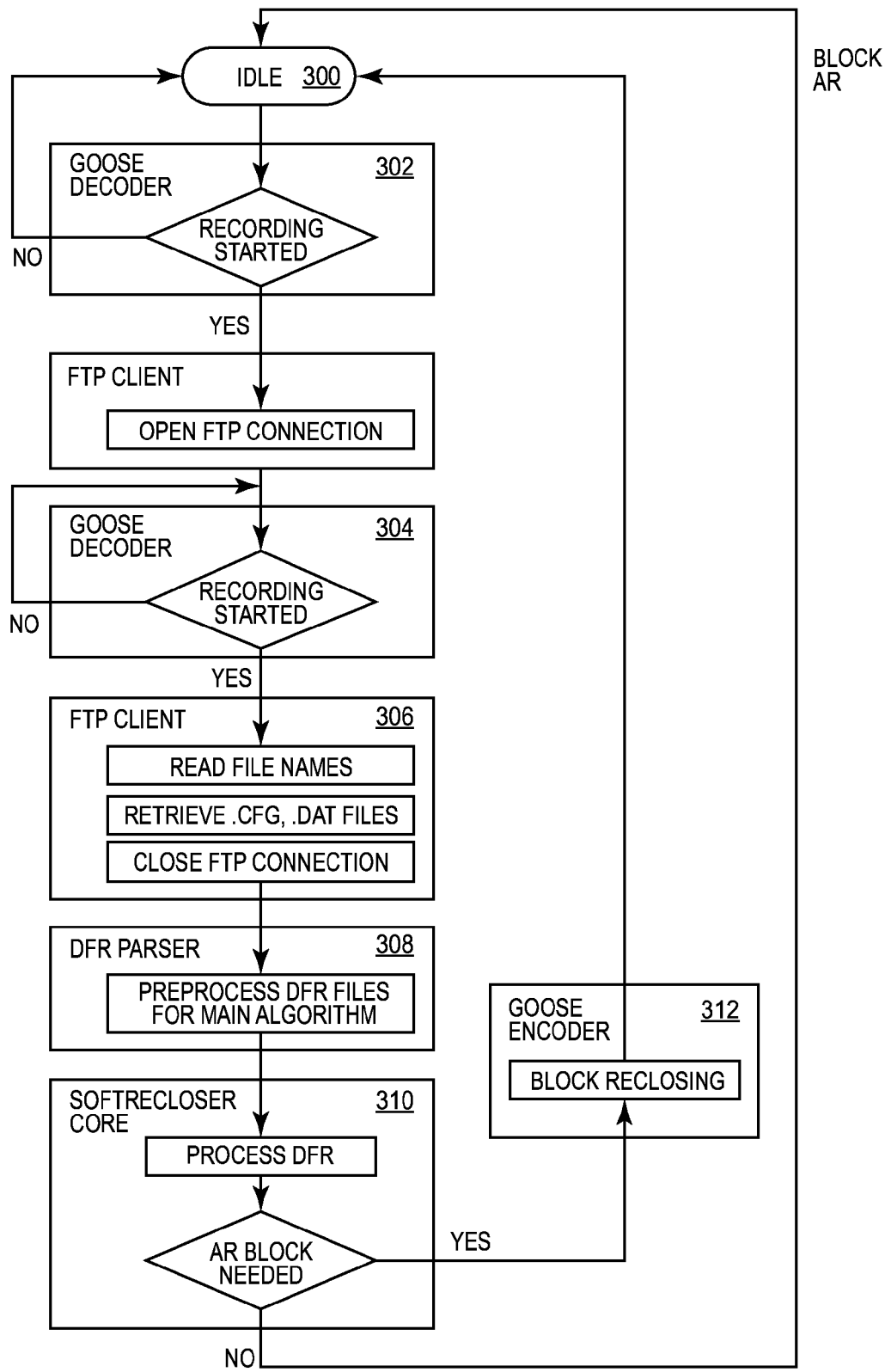
FIG. 3 illustrates a flow diagram of an embodiment of a method of overriding automatic reclosing of a fault interrupting device by the apparatus of FIG. 2.

Operation of the ICD 200 of FIG. 2 is described next in more detail with reference to FIG. 3. The ICD 200 remains in an idle state (Block 300) until a fault is detected by the IED 104. When a fault is detected by the IED 104, the overcurrent protection function of the IED 104 responsible for clearing the fault starts its timer and trips the mechanism when the timer expires. In this context, a fault is generally defined as an overcurrent condition exceeding a pre-determined threshold programmed into the IED 104 by the protection engineer. At the same time, the IED 104 begins recording a new digital fault record (DFR) which represents a time-domain snapshot of voltage and current waveforms as seen by the analog inputs of the IED 104 (Block 302). The record length of the digital fault record can be several tens of cycles, for example 50 cycles. The digital fault record can include some pre-fault data as well as the post-fault data.

The IED 104 sends a status update through its communication interface 118 using a GOOSE message to the ICD 200 that a new digital fault record recording has started. Digital fault records can be stored in the internal memory 114 of the IED 104 e.g. in IEEE COMTRADE format and can be retrieved externally through the communication interface 118 of the IED 104, for instance via IEC 61850 or DNP3 (distributed network protocol) file transfer mechanism, or through an FTP/Web interface. COMTRADE (Common format for Transient Data Exchange for power systems) is a file format for storing oscillography and status data related to transient power system disturbances. COMTRADE files are typically generated by IEDs in electrical substations during power systems disturbances.

Once the ICD 200 receives the GOOSE message indicating the IED 104 has begun recording a new digital fault record, the ICD 200 opens an FTP connection with the IED 104 (Block 304). When the digital fault record has completed recording and is stored in the memory 114 of the IED 104, the IED 104 sends another GOOSE message to the ICD 200 through its communication interface 118 indicating the digital fault record is available for retrieval. In response, the ICD 200 performs a read of the digital fault record from the IED memory 114 through the preexisting FTP connection. For example, the FTP client 122 of the ICD 200 can read the file names stored in the IED memory 114, retrieve the .cfg and .dat files associated with the digital fault record of interest, and close the FTP connection after receiving the desired information (Block 306).

After the digital fault record has been delivered to the ICD 200, the processing circuit 124 of the ICD 200 executes a fault analysis algorithm and decides whether to block automatic reclosing of the fault protection device 106. This can include pre-processing of the digital fault record so that the fault data is in proper form for analysis (Block 308). The data contained in the digital fault record is then analyzed and an autoreclosing block command ('Block AR') generated if the processing circuit 124 of the ICD 200 determines that automatic reclosing of the fault protection device 106 should be blocked e.g. in the case of a permanent fault or inclement weather conditions (Block 310). The autoreclosing block command is sent through the communication interface 102 of the ICD 200 to the IED 104 as a GOOSE message (Block 312).

By the time the digital fault record is stored in the IED memory 114, the IED 104 could disconnect the switchgear it controls due to the fault and typically will be in the middle of its autoreclosing timer period. When the autoreclosing timer expires, the IED 104 will attempt to re-energize the system by closing the fault interrupting device 106. Therefore the analysis performed by the ICD 100/200 must be fast so as it is completed and the control command to block autoreclosing issued when appropriate before the IED 104 attempts to automatically reclose the fault interrupting device 106.

In case the algorithm implemented by the processing circuit 124 of the ICD 100/200 could not determine the nature of the fault with a sufficiently high probability (for instance 0.90 to 0.95), the ICD 100/200 does not necessarily block the reclosing attempt and instead uses the digital fault record captured after the next reclosing to perform another analysis. Therefore, in the worst case, the algorithm implemented by the processing circuit 124 of the ICD 100/200 can allow the traditional multiple-shot reclosing sequence to go through until lockout.

Figure 4:
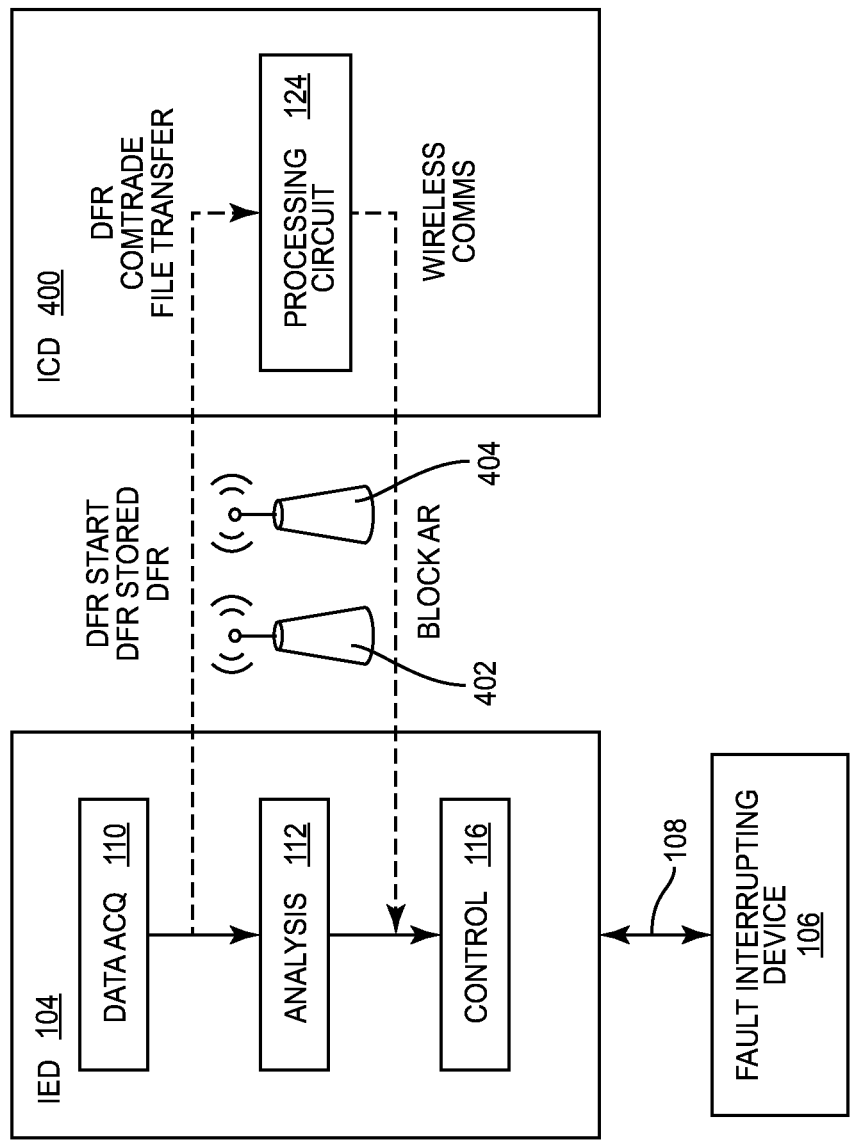
FIG. 4 illustrates a block diagram of yet another embodiment of an apparatus communicatively coupled to a fault interrupting device control system for providing distributed control of a fault interrupting device.

FIG. 4 illustrates yet another embodiment of an ICD 400. The embodiment shown in FIG. 4 is similar to the one shown in FIGS. 1 and 2, however, a low-latency wireless communication interface 402, 404 such as 4G LTE cellular communications is used for data exchange between the IED and the ICD. This includes transmitting the digital fault records (DFRs) from the IED 104 to the ICD 400 e.g. in IEEE COMTRADE format and transmitting an autoreclosing block command (Block AR) from the ICD 400 to the IED 104 to prevent automatic reclosing of the corresponding fault interrupting device 106.

The reclosing blocking methods associated with FIGS. 1 through 4 are particularly suitable for slower reclosing intervals, e.g. 2-10 seconds. If performance requirements are more stringent, e.g. the decision to block the consecutive reclosing attempt must be made in less than 2 seconds after the fault has been cleared, alternative auto-reclosing blocking designs can be used. For example, the ICD can completely bypass the internal IED data acquisition chain and receive data on the voltage and current waveforms from sensors built into or interfaced with the ICD.

Figure 5:
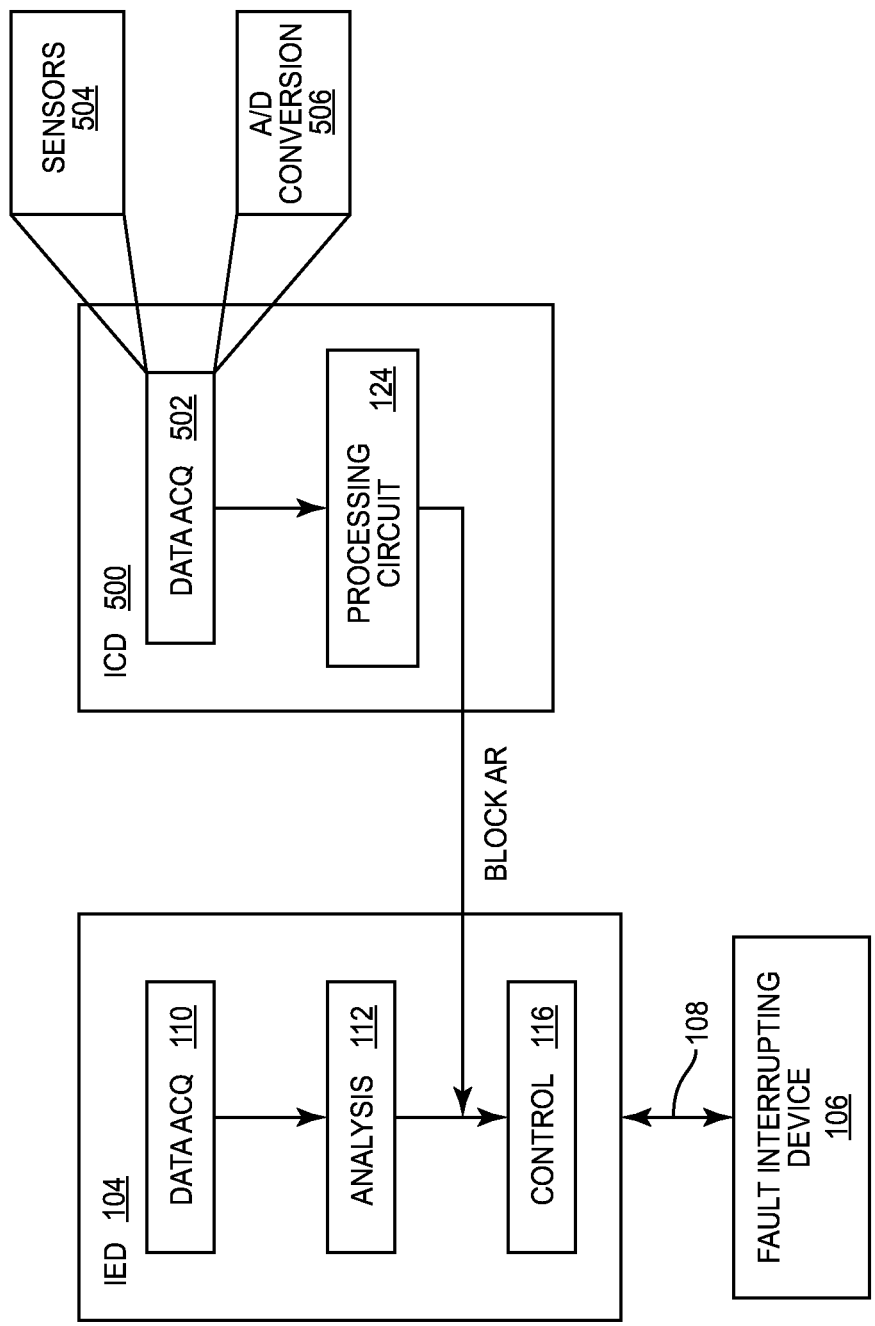
FIG. 5 illustrates a block diagram of still another embodiment of an apparatus communicatively coupled to a fault interrupting device control system for providing distributed control of a fault interrupting device.

FIG. 5 illustrates an embodiment of an ICD 500 that directly acquires voltage and/or current signals from the electric distribution system for analysis in determining whether to block automatic reclosing of a fault interrupting device 106. This way, the ICD 500 does not have to wait for digital fault records from the IED 104 before beginning the blocking analysis. As such, the ICD 500 of FIG. 5 can begin the blocking analysis process earlier than the ICD embodiments of FIGS. 1 through 4.

In more detail, the ICD 500 of FIG. 5 includes data acquisition circuitry 502 including sensors 504 for acquiring the voltage and current signals from the electric distribution system. In one embodiment, the voltage and current signals comprise voltage and current values sampled in accordance with IEC 61850-9-2. The data acquisition circuitry 502 of the ICD circuitry further includes A/D conversion circuitry 506 for converting the voltage and current signals into a digital representation. In one embodiment, the processing circuit 124 of the ICD 500 analyzes the digitized voltage and/or current signals from the electric distribution system in real time over a sliding window to determine whether to block automatic reclosing of a fault interrupting device 106 e.g. based on the fault type or weather conditions.

FIG. 6, which includes FIGS. 6A and 6B, illustrates exemplary current and voltage waveforms taken from the path having a permanent fault and sampled over a moving sampling window represented by a dashed box in FIGS. 6A and 6B. FIG. 6A shows the phase currents over multiple reclosing attempts during the permanent fault, and FIG. 6B shows the corresponding phase voltages over the same time period. In one embodiment, the sensors 504 have a sampling rate of 1 MHz or higher. For example, the sensors 504 can be high-precision, high-bandwidth Rogowski coils. Other types of high sampling rate sensors 504 can also be used. The fault analysis implemented by the processing circuit 124 of the ICD 500 can be executed in real-time over a moving window as opposed to post-processing. This enables reclosing blocking technology for short or instantaneous reclose intervals. As such, one or more of the automatic reclosing attempts can be blocked.

Also with such high-performance sensors 504, the voltage and current signals can be acquired from the load side of a tripped circuit breaker after the corresponding fault interrupting device interrupts a fault to capture arc dissipation transients. If the fault is a permanent fault type, the load-side voltage and current signals will contain high frequency secondary transients that decay over time.

Figure 7:
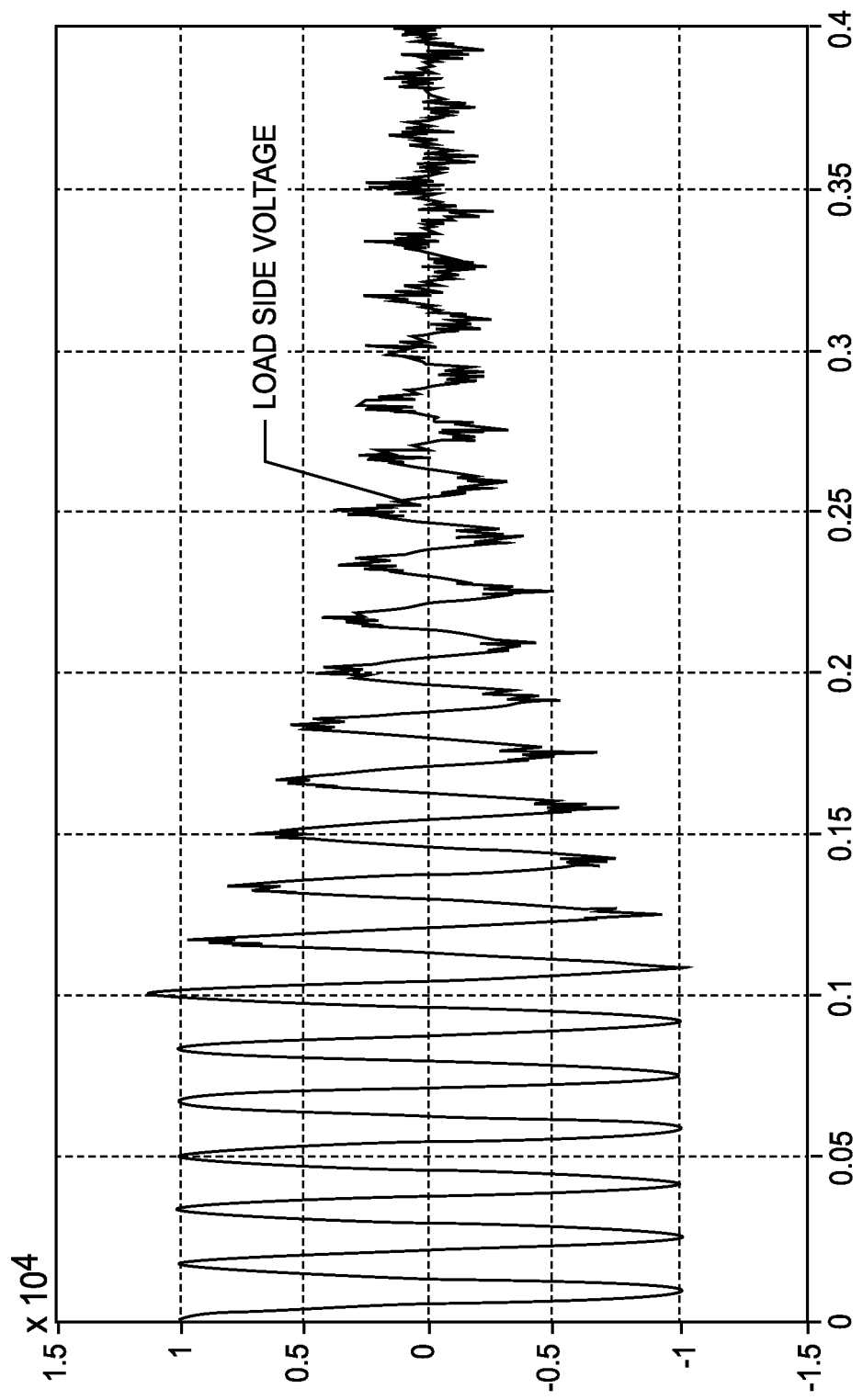
FIG. 7 illustrates a load-side transient fault sampled by an apparatus communicatively coupled to a fault interrupting device controller system for providing distributed control of the fault interrupting device.

FIG. 7 illustrates an exemplary load-side voltage transient that decays over time for a fault cleared at t=0.1 s. High-performance sensors 504 with a high sampling rate e.g. of 1 MHz or greater have sufficient precision to detect the transient at the load side. The processing circuit 124 of the ICD 500 can augment traditional fault record analysis with arc energy analysis to determine the nature of the fault and increase the algorithm confidence using the sampled high frequency secondary transient data. Such high frequency secondary transients are not detectable by low sampling rate sensors (e.g. 2.0 kHz) included in conventional IEDs.

In general when a fault occurs, the processing circuit 124 of the ICD 500 can begin to immediately process the digitized voltage and/or current signals in order to determine the type of fault i.e. temporary or permanent. Since this embodiment of fault analysis does not require retrieval of digital fault records from the IED 104, i.e. only the IED status (fault or no fault) is received by the ICD 100 from the IED 104, and just the autoreclosing block command is communicated to the IED 104, the communication bandwidth requirement is substantially decreased. In some embodiments, the data acquisition circuitry 502 of the ICD 500 can also detect the fault independent of the IED 104 and in response begin analyzing the voltage and current signals to determine whether to block automatic reclosing of the fault interrupting device 106. This further reduces the communication bandwidth requirement between the ICD 500 and the IED 104. This embodiment of autoreclosing blocking may be more amenable to field implementations that use wireless communication. In this case, the ICD 500 can be physically in a different location with respect to the IED 104.

Figure 8:
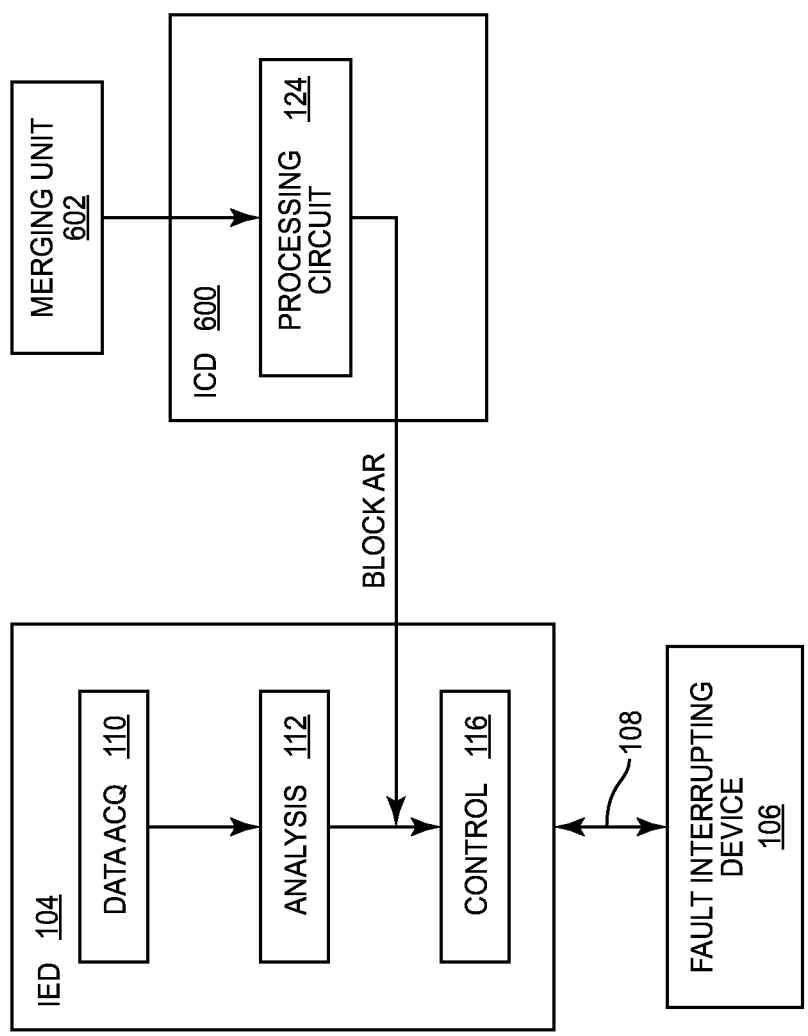
FIG. 8 illustrates a block diagram of an embodiment of an apparatus communicatively coupled to a fault interrupting device controller system for providing distributed control of the fault interrupting device.

FIG. 8 illustrates yet another embodiment of an ICD 600. The embodiment shown in FIG. 8 is similar to the embodiment shown in FIG. 5, however, the ICD 600 accepts digital voltage and current samples provided according to IEC 61850-9-2 Sampled Values (SV) specification. According to this embodiment, the ICD 600 receives digital voltage/current waveforms from a merging unit or other IED 602 capable of providing the sampled values. In this case, execution of the reclosing blocking analysis algorithm can be done in real-time and on a sample-by-sample basis e.g. as previously described herein with regard to FIGS. 5 through 7. The communication link between the merging unit 602 and the ICD 600 is preferably implemented with the Ethernet. The interface between the IED 104 and the ICD 600 can be via either wired communication (e.g. Ethernet) or wireless. Voltage and current waveforms from downstream sensors sent by wireless communication can be used to increase the confidence on the permanent nature of the faults.

Figure 9:
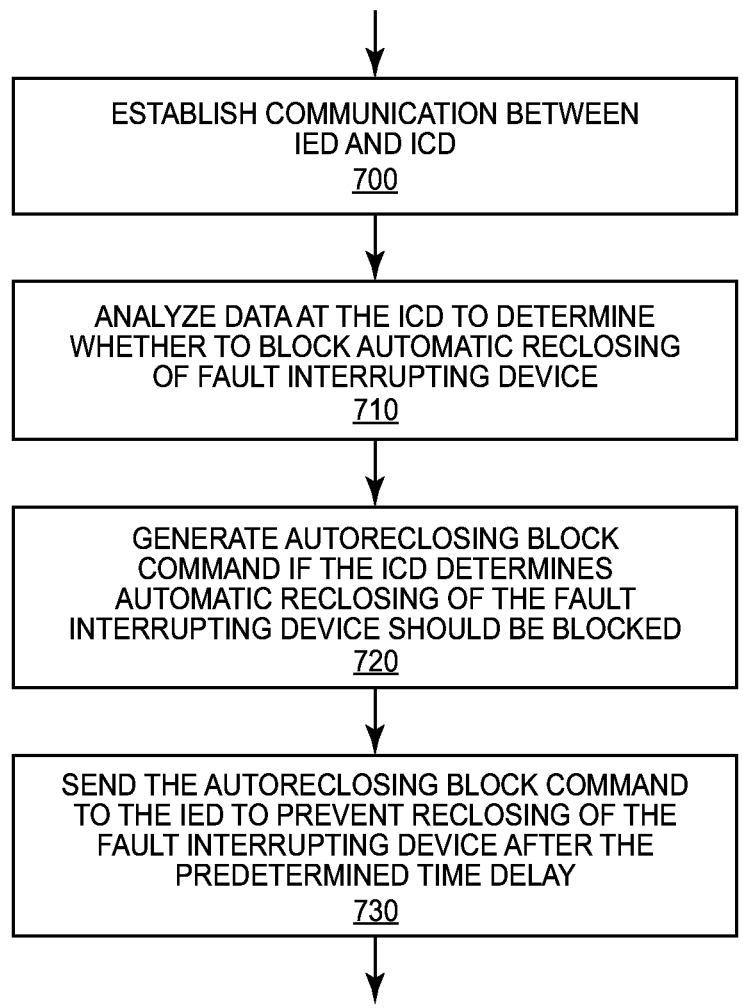
FIG. 9 illustrates a flow diagram of an embodiment of a method of overriding automatic reclosing of a fault interrupting device.

FIG. 9 illustrates an embodiment of a method of overriding automatic reclosing of a fault interrupting device which can be implemented by any of the ICD embodiments previously described herein. The method includes establishing communication with a control system (IED) of a fault interrupting device that is operable to open responsive to a fault on an electric distribution system and automatically reclose after a predetermined time delay (Block 700). The communication interface can be wired or wireless as previously explained herein. The method further includes analyzing data for the electric distribution system by an apparatus (ICD) separate from the IED and at higher performance than possible at the IED to determine whether to block the automatic reclosing of the fault interrupting device (BLOCK 710). The data analyzed by the ICD can be provided by the IED e.g. in the form of digital fault records, can be acquired directly by the ICD if the ICD is equipped with appropriate sensors, or delivered to the ICD from a device other than the IED in the form of sampled voltage and current waveforms. In each case, the method also includes generating an autoreclosing block command by the ICD if the ICD determines the automatic reclosing of the fault interrupting device should be blocked (Block 720) and sending the autoreclosing block command from the apparatus to the IED to prevent reclosing of the fault interrupting device after the predetermined time delay (Block 730). The autoreclosing block command can be executed by closing a digital output contact of the ICD, which is wired to a digital input of the IED.

The fault analysis and autoreclosing blocking embodiments described herein reduce stress on the electric distribution system components and extend their life cycle. Also, external implementation with respect to the IEDs allows easier retrofitting of existing systems, including IEDs with IEC 61850 interfaces. The fault analysis and autoreclosing blocking embodiments described herein are also readily compatible with smart grid solutions that rely on software and advanced communications technologies to implement control actions. Fail safe mechanisms are also provided as previously described herein, so that the autoreclosing blocking control action is aborted and automatic reclosing permitted if the desired confidence level is not achieved at the analysis stage.

In other embodiments, the ICDs described herein can enable the reclosing function in the IED instead of disabling the function. For example, a fault can be cleared by a circuit breaker with an associated IED which does not have reclosing functionality enabled by default. The ICD can perform the analysis previously described herein to determine that the fault is temporary. The ICD then sends a command to the IED for enabling reclosing. The reclosing interval in this case can be determined based, for example, on the energy spectrum of the load side voltage and current signals.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. An apparatus, comprising:
   a communication interface operable to enable communication with a control system for a fault interrupting device operable to open responsive to a fault on an electric distribution system and automatically reclose after a predetermined time delay; and
   a processing circuit having higher performance than the fault interrupting device control system and operable to:
   analyze data for the electric distribution system to determine whether to block the automatic reclosing of the fault interrupting device before the fault interrupting device automatically recloses; and
   generate an autoreclosing block command if the processing circuit determines the automatic reclosing of the fault interrupting device should be blocked,
   wherein the communication interface is further operable to communicate the autoreclosing block command to the fault interrupting device control system to prevent the automatic reclosing of the fault interrupting device after the predetermined time delay,
   wherein the data analyzed by the processing circuit includes a digital fault record received from the fault interrupting device control system via the communication interface, the digital fault record representing a time-domain snapshot of voltage and current waveforms observed at the fault interrupting device before and after the fault,
   and further wherein the communication interface is operable to:
   open an FTP (File Transfer Protocol) or websockets connection with the fault interrupting device control system responsive to receiving a message indicating the fault interrupting device control system has begun recording the digital fault record; and
   read the digital fault record from a memory of the fault interrupting device control system via the FTP or websockets connection responsive to receiving a message from the fault interrupting device control system indicating the digital fault record has finished recording.

2. The apparatus of claim 1, wherein the communication interface is operable to implement a protocol stack compliant with IEC 61850 for enabling communication with the fault interrupting device control system.

3. The apparatus of claim 1, wherein the processing circuit is a grid automation controller or a microcontroller.

4. The apparatus of claim 3, wherein the microcontroller includes a floating point unit for analyzing the data.

5. The apparatus of claim 1, wherein the processing circuit is further operable to analyze the data to determine whether the fault is a temporary fault type or a permanent fault type and generate the autoreclosing block command if the fault is determined to be a permanent fault type.

6. The apparatus of claim 5, wherein the processing circuit is operable to determine a probability of the fault being a permanent fault type based on the analyzed data and generate the autoreclosing block command if the probability of the fault being a permanent fault is above a predetermined threshold.

7. The apparatus of claim 1, wherein the data comprises voltage and current signals acquired from the electric distribution system, and wherein the processing circuit is operable to analyze the voltage and current signals in real time over a sliding window to determine whether to block the automatic reclosing of the fault interrupting device.

8. The apparatus of claim 7, further comprising:
   sensors operable to acquire the voltage and current signals from the electric distribution system.

9. The apparatus of claim 8, wherein the sensors have a sampling rate of 1 MHz or higher.

10. The apparatus of claim 8, wherein the sensors comprise Rogowski coils.

11. The apparatus of claim 7, wherein the voltage and current signals are acquired from a load side of the fault interrupting device, and wherein the processing circuit is operable to analyze the voltage and current signals for secondary transients having frequencies of around 1 MHz or greater that decay to determine whether to block the automatic reclosing of the fault interrupting device.

12. The apparatus of claim 7, wherein the voltage and current signals comprise voltage and current values sampled in accordance with IEC 61850-9-2.

13. The apparatus of claim 7, wherein the processing circuit is further operable to detect the fault independent of the fault interrupting device control system and in response begin analyzing the voltage and current signals to determine whether to block the automatic reclosing of the fault interrupting device.

14. A method of overriding automatic reclosing of a fault interrupting device, the method comprising:
    establishing communication with a control system for a fault interrupting device operable to open responsive to a fault on an electric distribution system and automatically reclose after a predetermined time delay;
    opening an FTP (File Transfer Protocol) or websockets connection with the fault interrupting device control system responsive to receiving a message at the apparatus indicating the fault interrupting device control system has begun recording the digital fault record;
    reading a digital fault record from a memory of the fault interrupting device control system via the FTP or websockets connection responsive to receiving a message at the apparatus indicating the fault interrupting device control system has finished recording the digital fault record;
    receiving the digital fault record from the fault interrupting device control system at the apparatus, the digital fault record representing a time-domain snapshot of voltage and current waveforms observed at the fault interrupting device before and after the fault;
    analyzing the digital fault record by an apparatus separate from the fault interrupting device control system and having higher performance than the fault interrupting device control system, to determine whether to block the automatic reclosing of the fault interrupting device before the fault interrupting device automatically recloses;
    generating an autoreclosing block command by the apparatus if the apparatus determines the automatic reclosing of the fault interrupting device should be blocked; and
    sending the autoreclosing block command from the apparatus to the fault interrupting device control system to prevent the automatic reclosing of the fault interrupting device after the predetermined time delay.

15. The method of claim 14, wherein the digital fault record analyzed by the apparatus comprises voltage and current signals acquired from the electric distribution system, the method further comprising:
    analyzing the voltage and current signals at the apparatus in real time over a sliding window to determine whether to block the automatic reclosing of the fault interrupting device.

16. The method of claim 15, further comprising:
    acquiring the voltage and current signals from a load side of the fault interrupting device by the apparatus at a higher sampling rate than possible at the fault interrupting device control system; and
    analyzing the voltage and current signals at the apparatus for secondary transients having frequencies of around 1 MHz or greater that decay, to determine whether to block the automatic reclosing of the fault interrupting device.

17. The method of claim 15, further comprising:
    detecting the fault by the apparatus independent of the fault interrupting device control system; and
    in response, analyzing the voltage and current signals to determine whether to block the automatic reclosing of the fault interrupting device.

18. The method of claim 14, further comprising:
    analyzing the digital fault record at the apparatus to determine whether the fault is a temporary fault type or a permanent fault type; and
    generating the autoreclosing block command if the fault is determined to be a permanent fault type.

19. The method of claim 14, further comprising: analyzing the digital fault record at the apparatus to determine whether the fault is a temporary fault type or a permanent fault type; and sending a command from the apparatus to the fault interrupting device control system for enabling reclosing of the fault interrupting device if the fault is determined to be a temporary fault type.

* * * * *